(12) United States Patent
Kiraz

(10) Patent No.: US 6,561,550 B1
(45) Date of Patent: May 13, 2003

(54) HOSE CONNECTION

(75) Inventor: Bahri Kiraz, Treuchtlingen (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 0 days.

(21) Appl. No.: 09/688,435

(22) Filed: Oct. 16, 2000

(51) Int. Cl.$^7$ ................................................ F16L 33/00
(52) U.S. Cl. ...................................... 285/259; 285/239
(58) Field of Search ................................ 285/259, 239

(56) References Cited

U.S. PATENT DOCUMENTS

| | | | | |
|---|---|---|---|---|
| 1,428,949 A | * | 9/1922 | Eastman | 285/259 |
| 2,410,600 A | * | 11/1946 | Cowles | 285/259 X |
| 4,875,719 A | * | 10/1989 | Mylett | 285/239 |
| 4,891,409 A | * | 1/1990 | Kuan et al. | 525/237 |
| 5,622,210 A | * | 4/1997 | Crisman et al. | 138/104 |
| 5,797,376 A | * | 8/1998 | Frank et al. | 123/509 |
| 6,158,784 A | * | 12/2000 | Lavender | 285/239 |

FOREIGN PATENT DOCUMENTS

| | | | | |
|---|---|---|---|---|
| FR | 2650050 | * | 7/1989 | 285/239 |
| FR | 2652872 | | 4/1991 | |
| GB | 2216971 | * | 10/1989 | 285/259 |

OTHER PUBLICATIONS

English Language Abstract of FR2652872, Apr. 12, 1991.

* cited by examiner

Primary Examiner—Lynne H. Browne
Assistant Examiner—David E. Bochma
(74) Attorney, Agent, or Firm—Dority & Manning, P.A.

(57) ABSTRACT

A hose connection for use in a vehicle is provided. The hose connection has a nozzle with at least one radial ring projecting from the surface of the nozzle. The hose connection also has a hose made of shrinkable material to provide a seal. The radial ring and hose act together to fix the hose to the nozzle. A related method of assembling the hose connection is also disclosed.

12 Claims, 3 Drawing Sheets

HOSE CONNECTION

FIELD OF INVENTION

The invention concerns a hose connection for compressed air and fuel supply lines in motor vehicles as well as a nozzle for such a connection.

BACKGROUND OF THE INVENTION

Such hose connections are disclosed, for instance, by FR 2652872 wherein they are formed by forcing a hose onto a penetrating nozzle. In order to obtain an axial securement of the hose on the nozzle, FR 2652872 proposes generally radially protruding, projecting rings on the circumferential surface of the nozzle. Upon the pushing of a hose, which is composed of an elastic plastic, onto the nozzle, the hose is radially expanded and thus passes over the radial projections. By the elastic tendency toward a return to an original shape, the inner wall of the hose is pressed against the circumferential surface of the nozzle and correspondingly against the projecting rings, whereby an axial and non-rotating securement of the hose is obtained and a sealing at the separating zone between the hose and the nozzle takes place.

A cursory view of this as being a very simple connection technology hides, however, substantial problems in real practice. In order to assure a satisfactory sealing and tight connection, a relatively high surface pressure is necessary, which necessitates a relatively large radial expansion of the hose. This stress brings about the danger of internal crazing and tension fissures in the hose, particularly in the areas of the projecting rings. Such material failures reduce the integrity of the tight seal and lessen security of the connection between hose and nozzle.

Added to this difficulty are mechanical, thermal and chemical effects throughout what is often a long operating life of a motor vehicle. Material fatigue is evidenced by hose relaxation, which is especially noticeable in extremely radially-stretched hoses. In the case of conventional hose connections, radial expansions up to double the original inside diameters are quite common.

OBJECTIVES AND SUMMARY OF THE INVENTION

Thus, an objective of the invention is to propose a hose connection, which during the lifetime of a motor vehicle assures both mechanical connection integrity as well as tight sealing.

This objective is achieved by a hose connection of the type stated by means of the features of the invention. Accordingly, a hose composed of:

| | |
|---|---|
| LDPE | i.e. low density polyethylene |
| HDPE | i.e. high density polyethylene |
| PUR | i.e. polyurethane |
| PA-6 | i.e. Polyamide |
| PA-12 | i.e. Polyamide |
| PE-X | i.e. polyethylene cross linked with silane | or a mixture of PA6 and PE is suggested. The outside diameter of the hose or that of the projecting rings, discussed below, is 40 to 60% larger than its inside diameter. Experience has shown that within this range of widening, in the case of hoses made of the above named materials, a reliable mechanical connection and sealing of the said hose is assured over the entire lifetime of the motor vehicle. By the planned co-action between the nozzle and the hose, no fissure formation nor crazing appears upon the pushing on of the hose. Particularly good results are achieved when the outside diameter of the projecting rings, for instance, were less than or equal to 1.8 times the hose diameter. As a rule, hoses are produced by an extrusion process. As a result of this, there occurs an orientation of the macromolecules of the polymerized materials along the longitudinal extent of the hose. The greater the degree of this orientation, the less the danger of crazing and tension fissuring. Advantageously, a material which exhibits a shrinkage of 2 to 6% when measured in an axial direction is provided. The shrinkage, which is a measure of the degree of orientation of the macromolecules, is determined in a test in which, for instance, a HDPE-hose is heated for 1 hour at a temperature less than its softening point upon heating, the molecules stretched by the extrusion process return to their original random and thus shortened condition. Decreased hose length is measured during this time.

In accordance with the invention, the pushing of the hose end onto the nozzle is made easier. Beyond that, the expansion of the hose end is accomplished, not suddenly, but gradually in a material protective manner. Advantageously, two projecting rings are available, the diameters of which respectively increase in the direction (see arrow 5) of hose thrust in accord with the invention. A particularly advantageous embodiment of the invention provides that the first projecting ring is divided into three longitudinal sections of differing slopes. By means of this formation, and particularly because of the central cylindrical section, the action toward position sealing is increased. In consideration of an improved sealing action and a protective penetrative insertion of the nozzle into the hose, advantageous angles of inclination are suggested by the invention.

In the case of an embodiment in accord with the invention, by means of the sharply edged design of the first projecting ring with its lesser diameter, an axial fix of a hose by means of a still allowable notch-effect is achieved. The second projecting ring with its greater diameter has, on the other hand, a rounded off edge, whereby a lessened notch-effect is available but with a still sufficing axial fix. Alternatively, the invention provides for a reduction in the extension of a hose at its end section. In the case of this end section of a hose, the danger of fissures and crazing as a result of an extended time of operation is particularly great.

By the demands of torsion at the hose connection, the danger is present that the holding friction between the nozzle and the hose material is overcome, whereby the hose end rotates in respect to the nozzle. When this occurs, faulty sealing can result. By flattened zones on the circumferential surfaces of the nozzle in accord with the invention, a rotation-prevention means is created. The outer hose wall lies in a shape-sealing closure with this flattened zone. Advantageously, the flattened zones are located between that end of the nozzle remote from the hose and the second projecting ring. An additional hindrance to hose rotation on the nozzle is assured by shaping as provided in another possible aspect of the invention.

BRIEF DESCRIPTION OF THE DRAWINGS

The invention is now explained in more detail with the aid of the attached drawings. There is shown in.

DETAILED DESCRIPTION OF THE INVENTION

Figure 1:
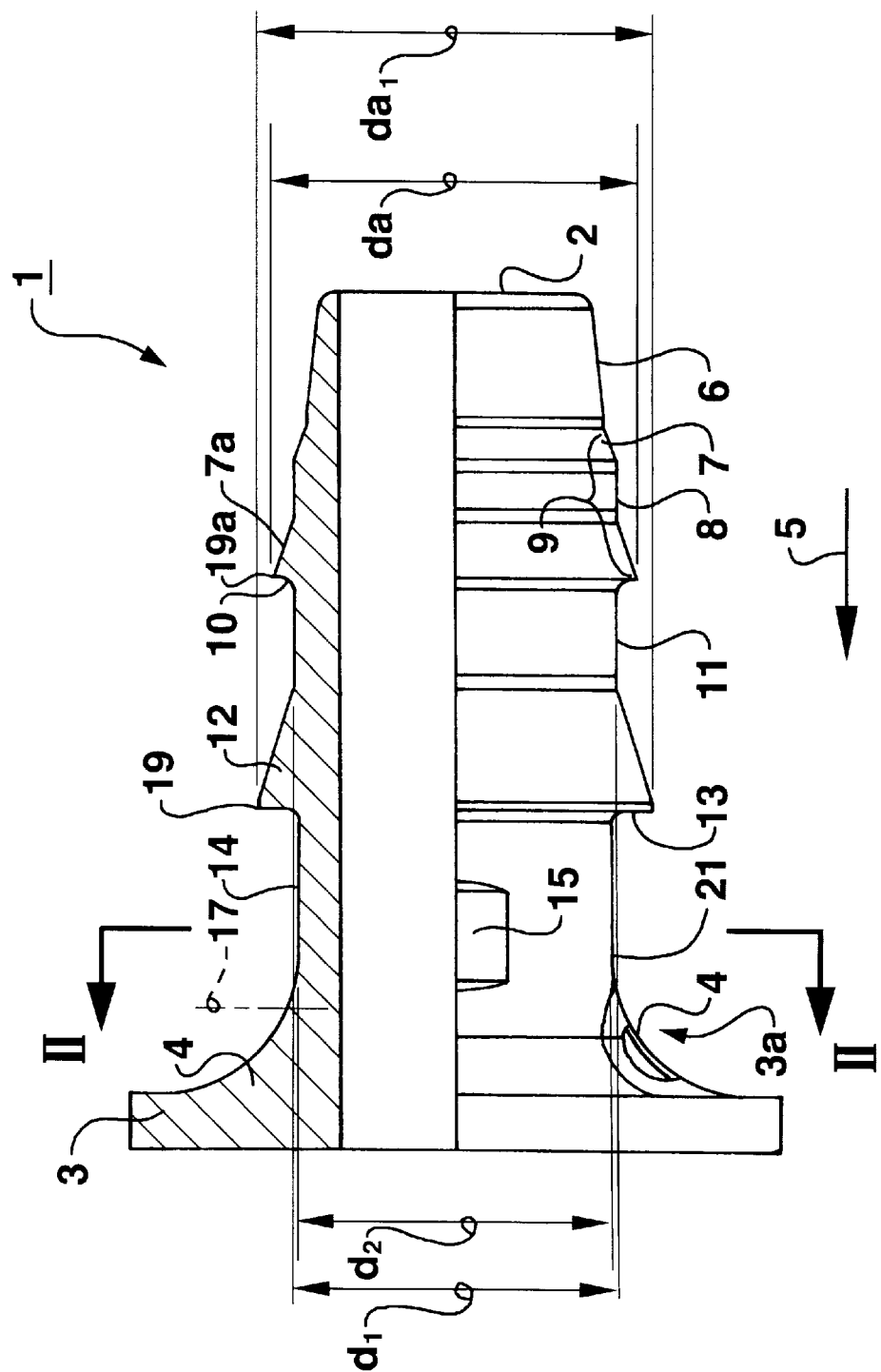
FIG. 1 a partially sectioned profile view of a nozzle.
Figure 2:
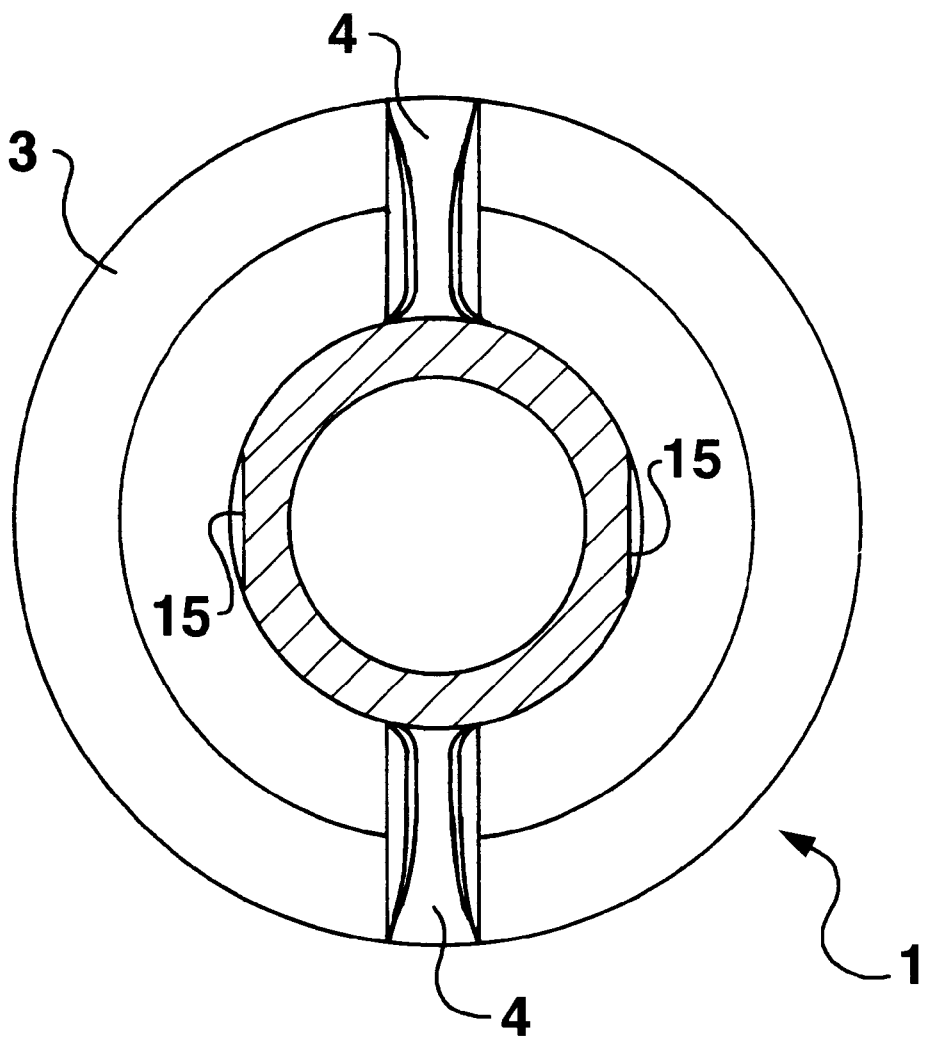
FIG. 2 a sectional view in accord with the line II—II of FIG. 1.

Detailed reference will now be made to the drawings in which examples embodying the present invention are shown. The drawings and detailed description provide a full and detailed written description of the invention and of the manner and process of making and wiring it, so as to enable one skilled in the pertinent art to make and use it, as well as the best mode of carrying out the invention. However, the examples set forth in the drawings and detailed description are provided by way of explanation of the invention and are not meant as a limitation of the invention. The present invention thus includes any modifications and variations of the following examples as come within the scope of the appended claims and their equivalents.

The nozzle 1 illustrated in the drawings is a tube section made of POM, i.e., polyoxymethylene upon the one end of which, namely on its penetrating end 2, a hose 20 may be encapsulatingly thrust on. On the other end, a flange 3 extending radially outward has been molded on the nozzle. The nozzle can be fastened to a another matching component by virtue of the flange. Molded on the transition cone 3a between flange 3 and the tube section 2 in two diametrically opposed positions are strengthening webs 4. The webs 4 extend radially outwardly on the flange and in the longitudinal direction of the nozzle 1.

The nozzle 1 is divided into differently shaped longitudinal sections. On the penetrating end 2 is a first section, which widens itself conically and forms an entry cone 6 with an inclination angle of 6°. This eases the pushing on of the hose 20 and forms a coactive sealing bond with the inner lining 18 of the hose. At the entry cone 6, a first projecting ring 9 integrally abuts. This projection is divided into three longitudinal sections, namely as seen in the thrust direction (see arrow 5) comprising a first cone shaped longitudinal section 7, a cylindrical longitudinal section 8 and connected thereto, a second cone shaped longitudinal section 7a. After the first, circumferential, projecting ring 9, a second projecting ring 12 abuts wherein, between the projecting rings 9 and 12, a first cylindrical section 11 is placed.

The first projecting ring 9 transitions toward the flange 3 to a shoulder 10 in the cylindrical section 11, which has essentially the same outside diameter as does the cylindrical longitudinal section 8. The second projecting ring 12 fares with a radial shoulder 13 into a second longitudinal cylindrical section 14. The outside diameter $d_a$ of the second projecting ring 12 is greater than the outside diameter $d_{a1}$ of the first projecting ring 9. The outside diameter $d_2$ of the second longitudinal section 14 is less than the outside diameter $d_1$ of the first longitudinal cylindrical section 11.

On the longitudinal section 14 are provided two diametrically opposite and transversely placed (as they appear from above) flat surfaces 15. These serve to assist resistance against rotation between hose and nozzle. An additional anti-rotation fix is achieved by the webs 4. These possess sections which run at a sharp angle to the circumferential surface of the longitudinal section 14. The web 4 sections then extend so far in an axial direction that they overlap the flat surfaces 15.

Figure 3:
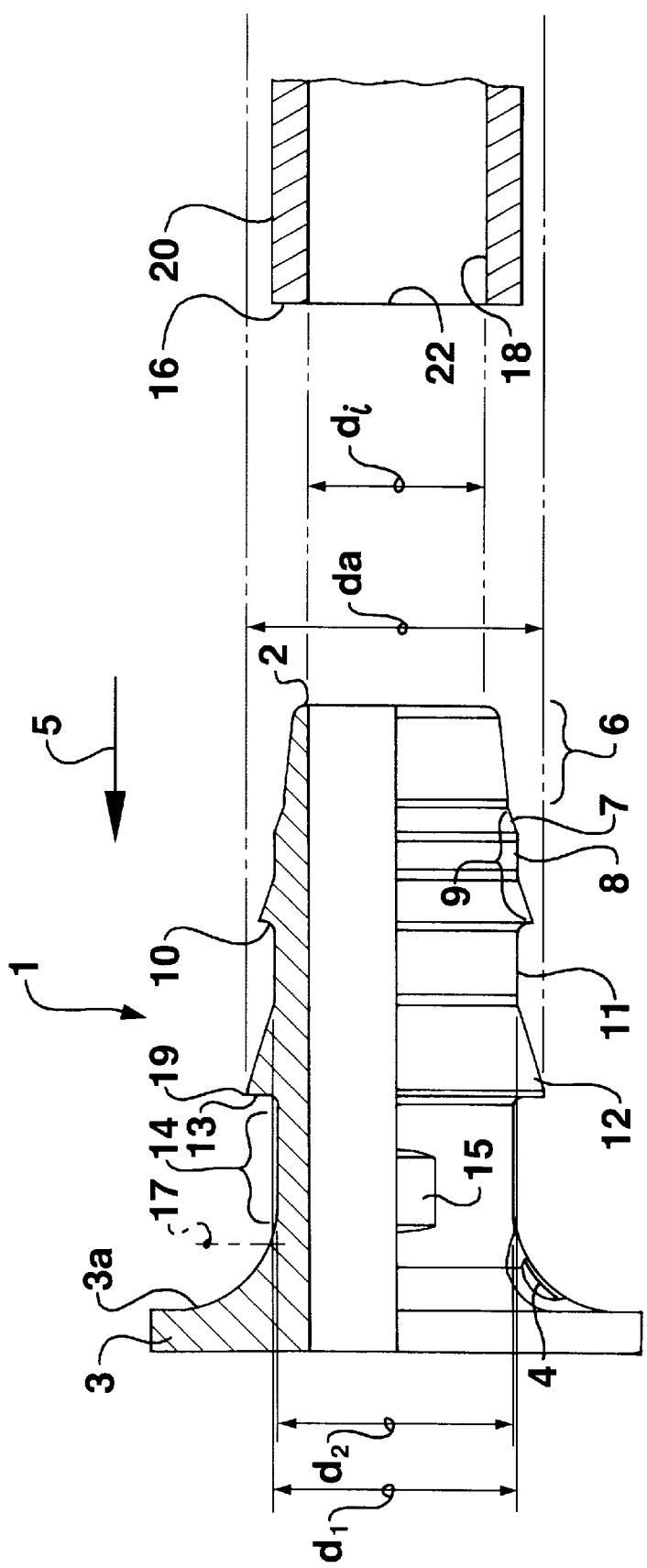
FIG. 3 a nozzle in a view according to FIG. 1 with a portion of a hose co-acting therewith.

Upon the pushing of the hose 20 upon the nozzle 1, the front end 16 thereof is at first only slowly expanded in a radial direction. At the conclusion of the penetrative motion, the front end 16 of the hose 20 is placed at the terminal circle 17 as shown in FIG. 3. The hose entry area 22 following front 16 circles with its inner wall 18 the outer, circumferential surface of the section 14 thereby lying against the flat surfaces 15. The projecting ring 12 has the greatest diameter $d_a$ and contributes most to expanding the hose. The diameter $d_a$ of the projecting ring 12 is so measured that it lies within a range of 1.4 to 1.85 times the inside diameter $d_i$ of the hose.

The nozzle 1 and hose 20 are shown in FIG. 3 at a scale of 10:1. The inside diameter $d_i$ of the hose 20 runs about 2.3 mm. The diameter $d_a$, on the other hand, is about 4.1, being thus greater than the inside diameter $d_i$ of the hose by a factor of 1.78. The hose 20 and the largest ring projection 12 are also so mutually designed that the hose when fully connected is expanded by about 80% radially. The hose material, namely HDPE, LDPE, PA-6, PA-12, or a mixture of PA-6 and PE assures during such radial expansion, a reliable axial fix of the hose 20 on the nozzle 1. Such a connection will also be free of the formation of fissures and crazing during connection or later.

The second edge 19 of the second projecting ring 12 is rounded off, thereby diminishing the notch action on the hose inner wall. The first edge 19a of the first ring 9, which is less radially extended, is, on the other hand, designed to be pointed or wedge-like, which acts favorably toward the axial securement of the hose 20.

It will be apparent to those skilled in the art that various modifications and variations can be made in the present invention without departing from the scope and spirit of the invention. For example, specific shapes of various elements of the illustrated embodiments may be altered to suit particular hose connector applications. It is intended that the present invention include such modifications and variations as come within the scope of the appended claims and their equivalents.

What is claimed is:

1. A hose connection for compressed air and fuel use in a vehicle comprising:
   a sealingly engageable, wear resistant hose comprising one of LDPE, HDPE, PUR, PA-6, and PA-12, or a mixture of PA-6 and PE, the hose having an inner diameter of $d_i$;
   a nozzle having a flange, a longitudinal section and a circumferential surface defining a flat portion;
   at least two radial rings projecting from the circumferential surface of the nozzle, a respective one of the at least two radial rings defining an outside diameter $d_a$ that is 40% to 85% greater than $d_i$; and
   at least one strengthening web attached proximate the flange, the longitudinal section being disposed in a transition zone such that the at least one strengthening web overlaps a portion of the flange and a part of the flat portion.

2. The hose connection of claim 1, wherein a material of the hose has an initial extruded length, the extruded hose material adapted to be heated such that the hose exhibits a shrinkage of from 2% to 6% in an axial direction relative to the initial extruded length, the shrunken hose configured to be thrust upon the nozzle.

3. The hose connection of claim 1, wherein the nozzle has a penetrating end and an entry cone, and the nozzle increases radially from proximate the penetrating end toward the flange to form the entry cone from proximate the penetrating end.

4. The hose connection of claim 3, wherein a first radial ring of the two radial rings is disposed closer to the penetrating end and has a smaller outside diameter da than the da of a second ring of the two radial rings disposed closest the flange.

5. The hose connection of claim 4, wherein the second ring defines a first section configured to be cone-shaped and radially expanding, a first cylindrical section having a first diameter $d_1$, and a second section configured to be cone-shaped and radially expanding, the first section proximate the penetrating end, the second section disposed away from the first-section in a direction of the flange, and the first cylindrical section disposed between the first section and the second section.

6. The hose connection of claim 5, wherein the first and second sections respectively define a first and a second edge, the first edge sharp and the second edge is rounded off.

7. The hose connection of claim 5, further comprising a second cylindrical section defining a second diameter $d_2$, the second cylindrical section disposed between the flange and the second section.

8. The hose connection of claim 7, wherein $d_2$ is less than $d_1$.

9. The hose connection of claim 1, wherein the at least two radial rings are disposed axially apart from each other on the circumferential surface of the nozzle.

10. The hose connection of claim 1, wherein the circumferential surface has at least one flat portion disposed thereon.

11. The hose connection of claim 10, wherein the at least one flat portion is disposed on the second cylindrical section proximate the flange.

12. The hose connection of claim 1, wherein the nozzle is composed of POM and further defines a penetrating end.

* * * * *

UNITED STATES PATENT AND TRADEMARK OFFICE
CERTIFICATE OF CORRECTION

PATENT NO. : 6,561,550 B1 Page 1 of 1
DATED : May 13, 2003
INVENTOR(S) : Bahri Kiraz It is certified that error appears in the above-identified patent and that said Letters Patent is hereby corrected as shown below:

Column 4,
Line 65, please delete "da" and insert -- $d_{a1}$ --

Signed and Sealed this

Sixteenth Day of December, 2003

JAMES E. ROGAN
*Director of the United States Patent and Trademark Office*